United States Patent [19]
Lennen

[11] Patent Number: 5,952,960
[45] Date of Patent: Sep. 14, 1999

[54] METHOD AND APPARATUS FOR RECEIVING A PSEUDORANDOM CODE

[75] Inventor: Gary R. Lennen, Cupertino, Calif.

[73] Assignee: Trimble Navigation Limited, Sunnyvale, Calif.

[21] Appl. No.: 09/175,601

[22] Filed: Oct. 19, 1998

Related U.S. Application Data

[62] Division of application No. 08/580,353, Dec. 28, 1995, Pat. No. 5,825,887.

[51] Int. Cl.$^6$ .............................. H04B 7/185; G01S 5/02

[52] U.S. Cl. ...................... 342/357.01; 701/213

[58] Field of Search ............... 342/357, 357.01; 701/213

[56] References Cited

U.S. PATENT DOCUMENTS

| | | | |
|---|---|---|---|
| 5,523,761 | 6/1996 | Gildea | 342/357 |
| 5,541,606 | 7/1996 | Lennen | 342/357 |

*Primary Examiner*—Theodore M. Blum
*Attorney, Agent, or Firm*—Boris G. Tankhilevich

[57] ABSTRACT

The delayed correlation receiver for delay-processing the encrypted satellite signals is disclosed. A central station is designed to receive encoded satellite signals using a high gain antenna. The central station extracts the encrypted satellite information and transmits it to the delayed correlation receiver. The delayed correlation receiver receives the encrypted satellite information using the standard satellite antenna and performs the full correlation with the encrypted information received from the central station without requiring the secret encryption keys.

5 Claims, 5 Drawing Sheets

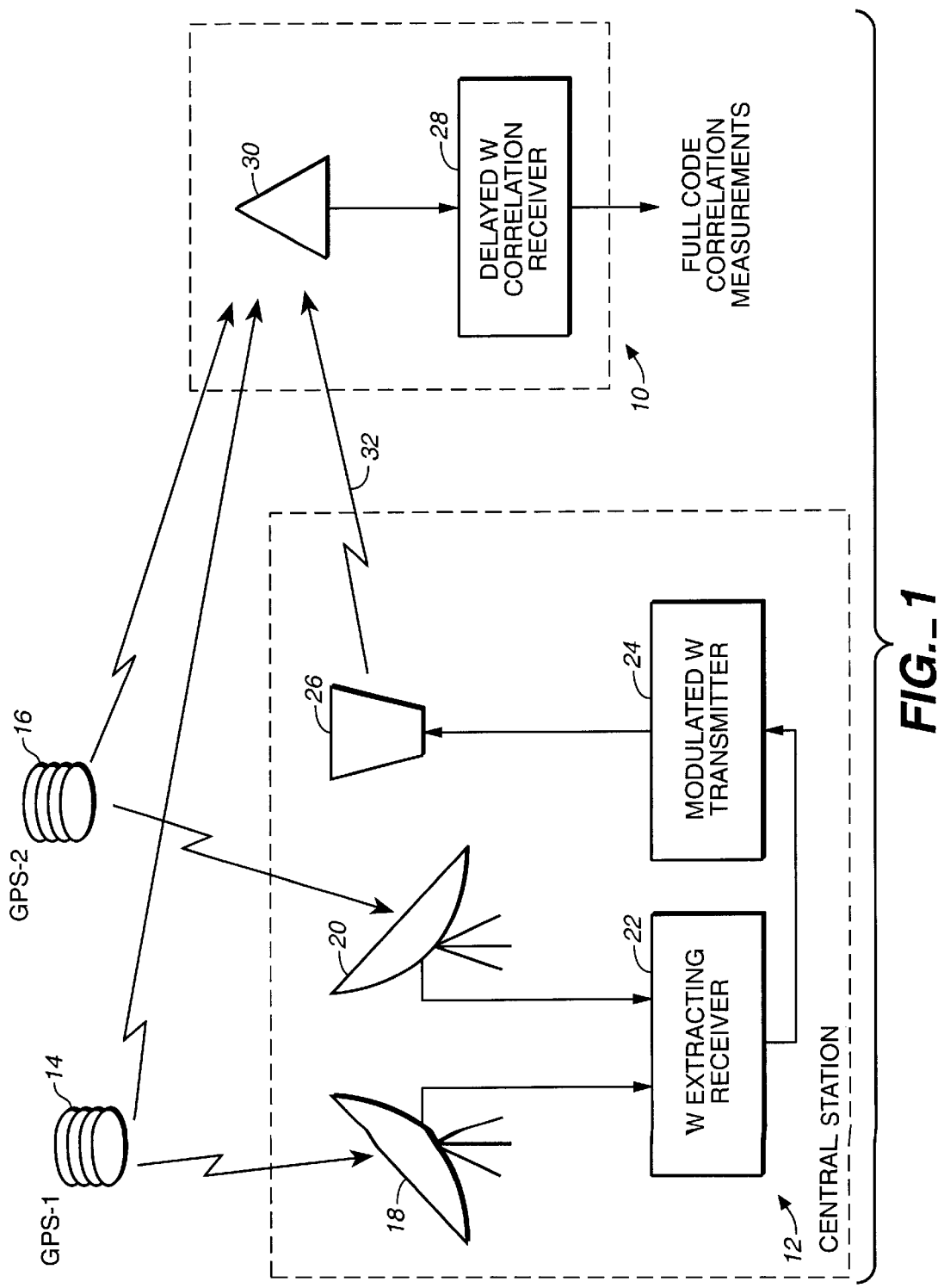
FIG._1

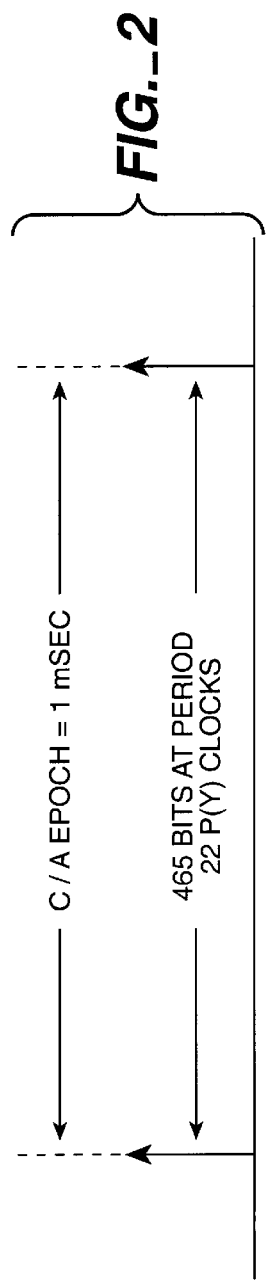
FIG._2
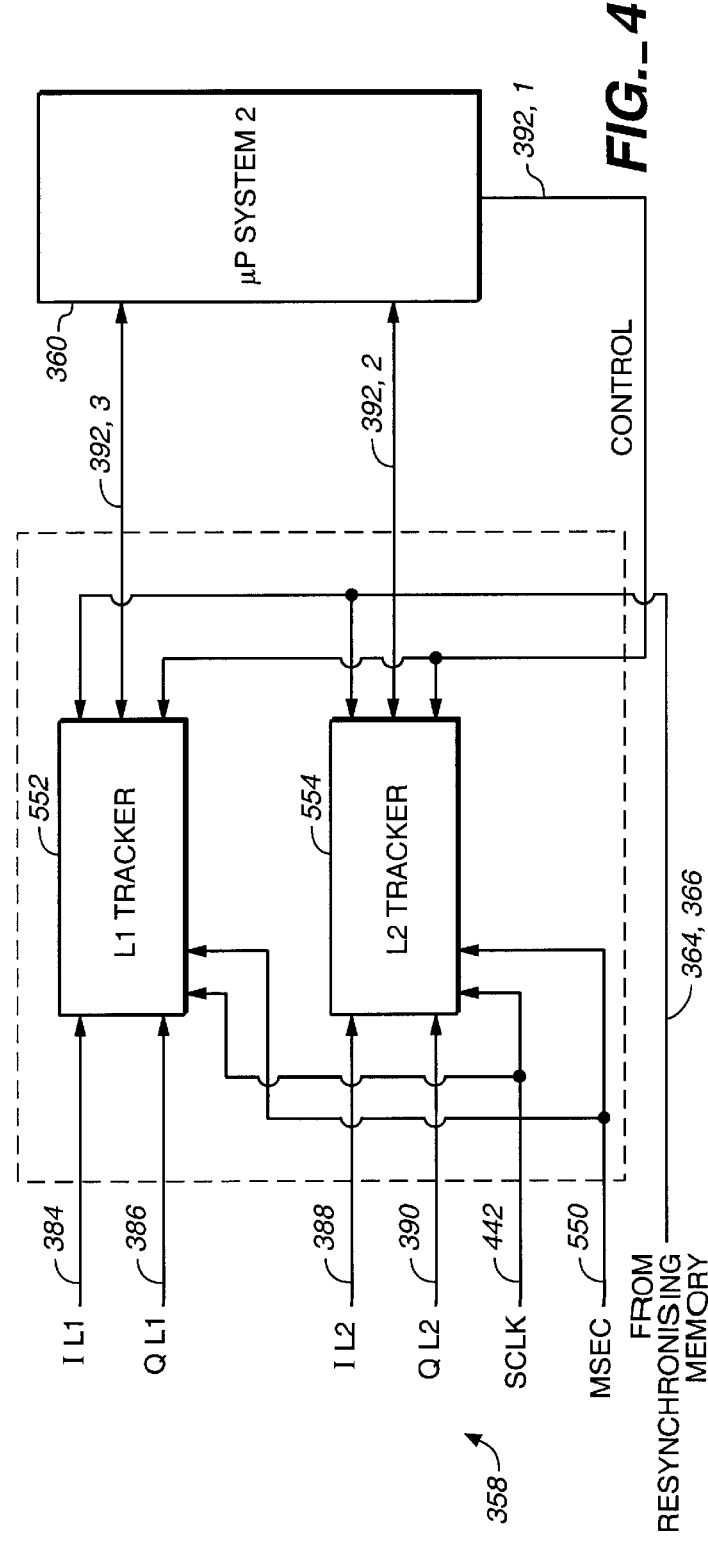
FIG._4

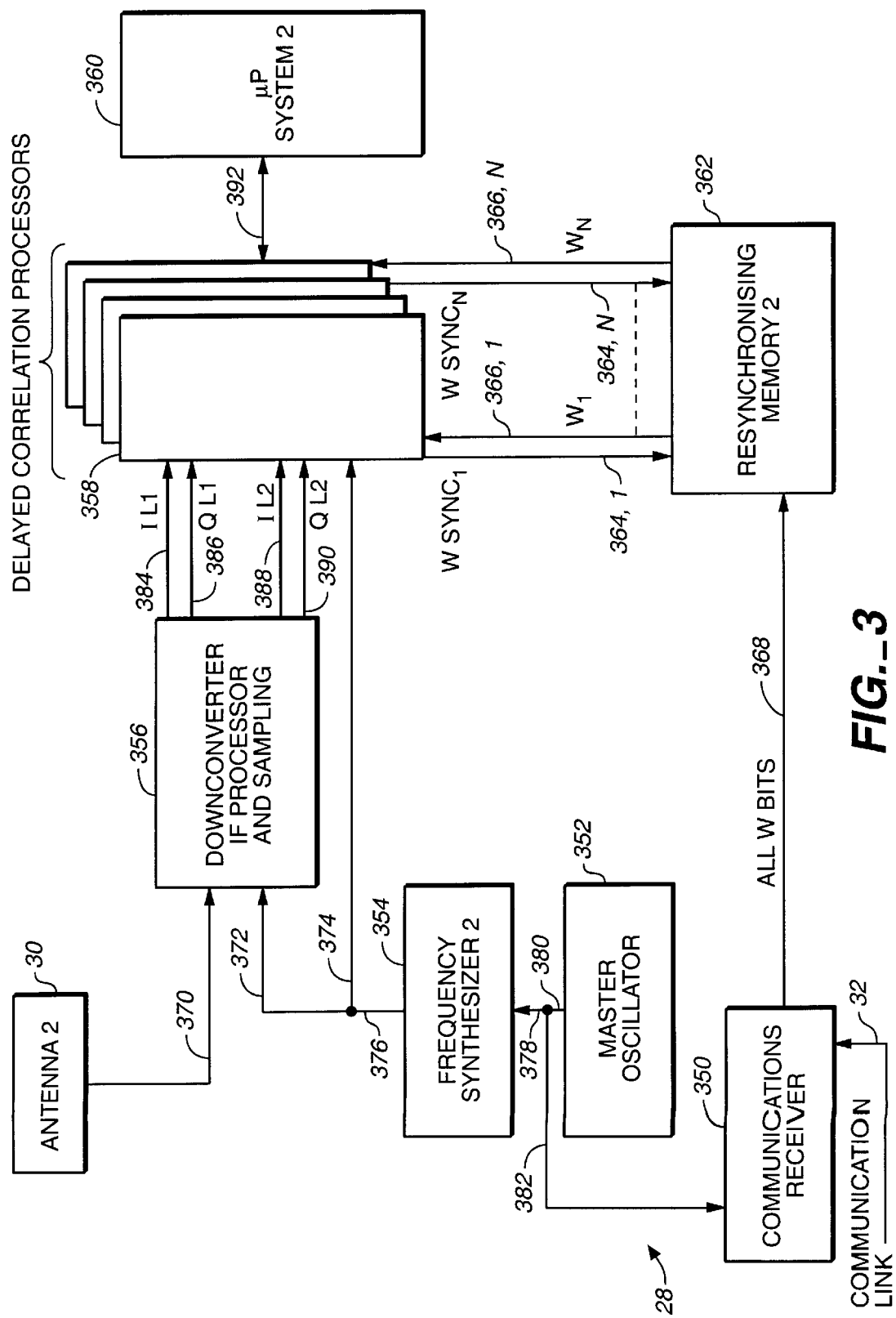
FIG._3

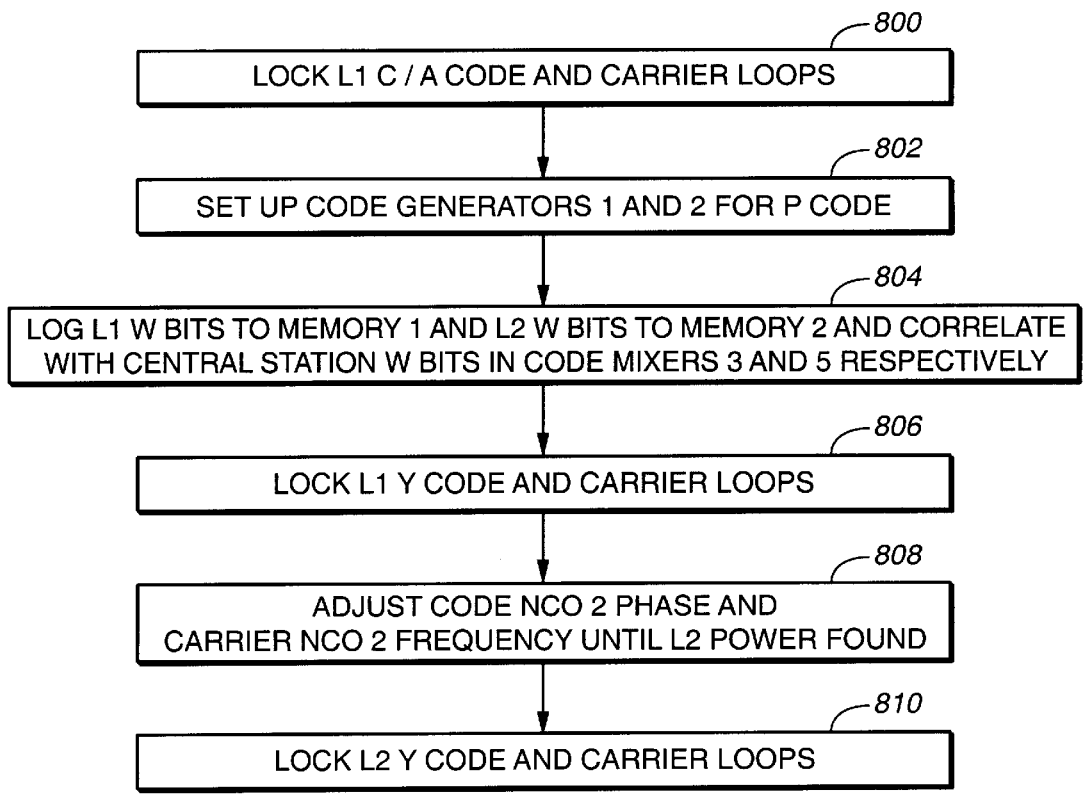
FIG._5
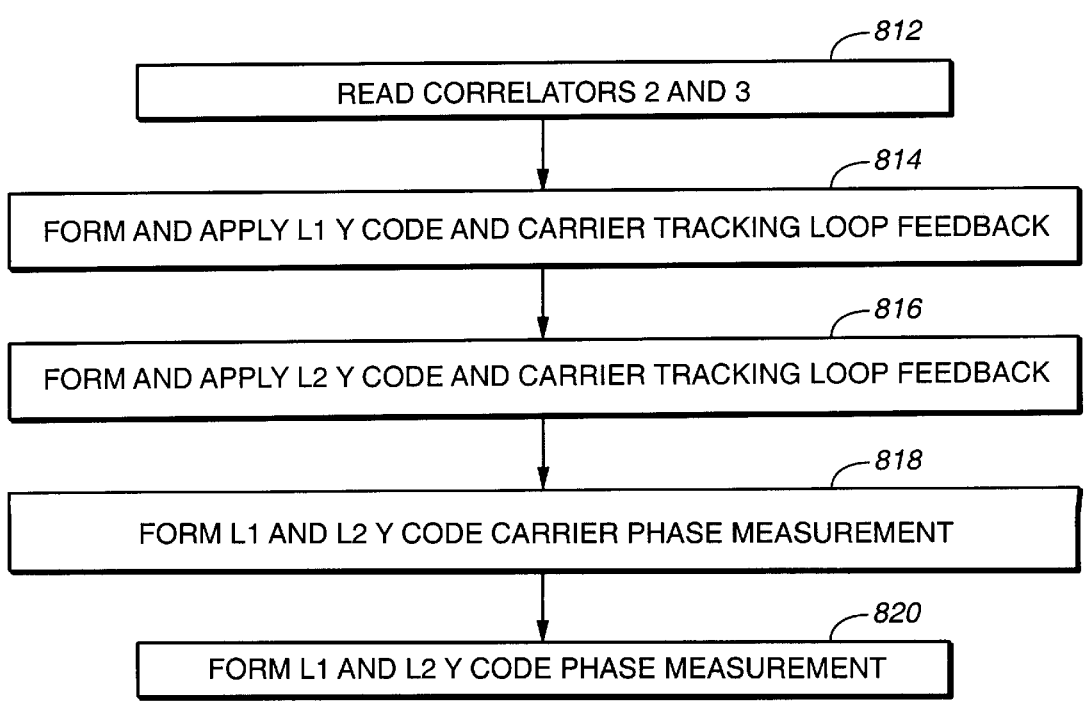
FIG._6

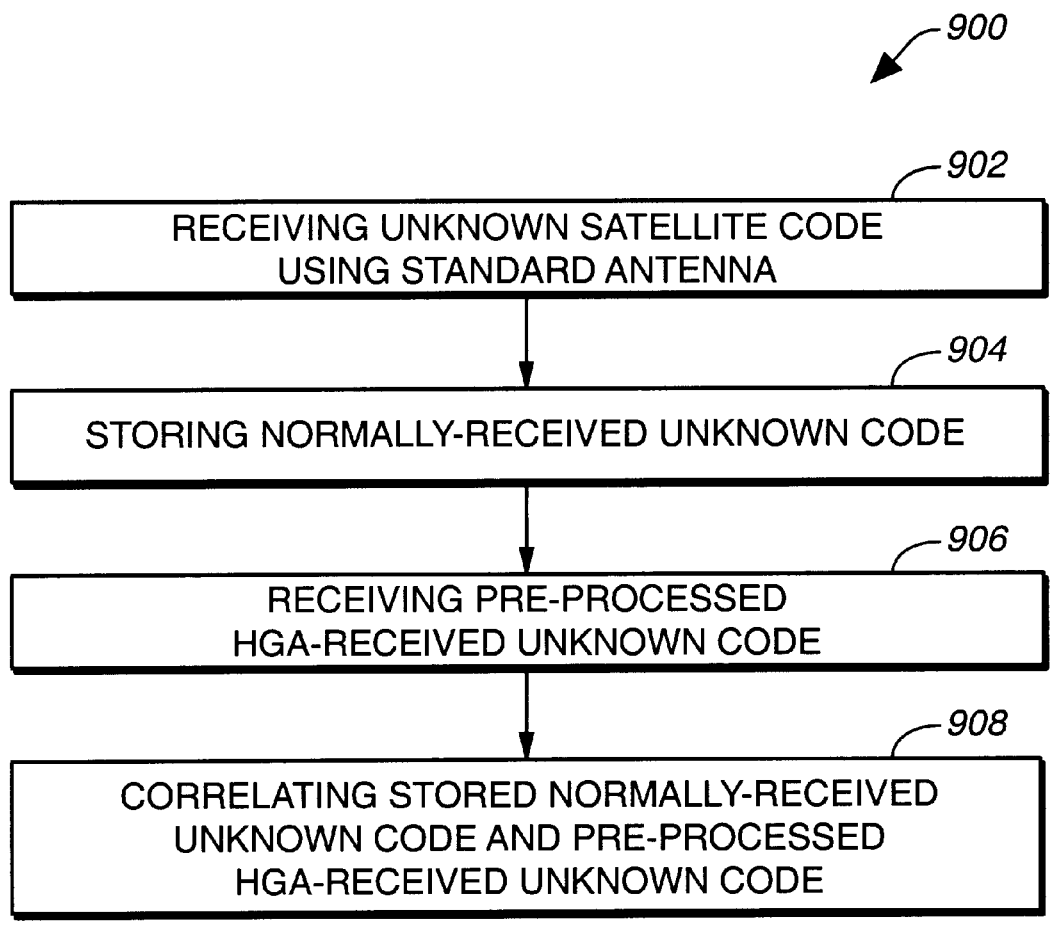
FIG._7

METHOD AND APPARATUS FOR RECEIVING A PSEUDORANDOM CODE

This is a divisional application for the U.S. patent application Ser. No. 08/580,353, filed Dec. 28, 1995 issued as U.S. Pat. No. 5,825,887 on Oct. 20, 1998.

BACKGROUND

This invention relates to a method and apparatus for delayed correlation of the unknown satellite code emanating from a Satellite Positioning System (SATPS). The SATPS can include different satellite systems. One of those systems is a Global Positioning System (GPS).

The GPS is a system of satellite signal transmitters, with receivers located on the Earth's surface or adjacent to the Earth's surface, that transmits information from which an observer's present location and/or the time of observation can be determined. There is also the Global Orbiting Navigational System (GLONASS), which can operate as an alternative GPS system.

The GPS is part of a satellite-based navigation system developed by the United States Defense Department under its NAVSTAR satellite program. A fully operational GPS includes up to 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, four or more GPS satellites will be visible from most points on the Earth's surface, and visual access to four or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an Li signal having a frequency f1=1575.42 MHz and an L2 signal having a frequency f2=1227.6 MHz. These two frequencies are integral multiplies f1=1540 f0 and f2=1200 f0 of a base frequency f0=1.023 MHz. The L1 signal from each satellite is binary phase shift key (BPSK) modulated by two pseudorandom noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay~$f^2$) This phenomenon is discussed by MacDoran in U.S. Pat. No. 4,463,357, which discussion is incorporated by reference herein. When transit time delay through the ionosphere is determined, a phase delay associated with a given carrier signal can also be determined. The phase delay which is proportional to the time difference of arrival of the modulated signals is measured in real time by cross correlating two coherently modulated signals transmitted at different frequencies L1 and L2 from the spacecraft to the receiver using a cross correlator. A variable delay is adjusted relative to a fixed delay in the respective channels L1 and L2 to produce a maximum at the cross correlator output. The difference in delay required to produce this maximum is a measure of the columnar electron content of the ionosphere.

Use of the PRN codes allows use of a plurality of GPS satellite signals for determining an observer's position and for providing the navigation information. A signal transmitted by a particular GPS satellite is selected by generating and matching, or correlating, the PRN code for that particular satellite. Some of the PRN codes are known and are generated or stored in GPS satellite signal receivers carried by ground observers. Some of the PRN codes are unknown.

A first known PRN code for each GPS satellite, sometimes referred to as a precision code or P-code, is a relatively long, fine-grained code having an associated clock or chip rate of 10 f0=10.23 MHz. A second known PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B-PR, Jul. 3 1991, which is incorporated by reference herein.

The GPS satellite bit stream includes navigational information on the ephemeris of the transmitting GPS satellite (which includes complete information about the transmitting satellite within the next several hours of transmission) and an almanac for all GPS satellites (which includes less detailed information about all other satellites). The satellite information transmitted by the transmitting GPS has the parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *The NAVSTAR Global Positioning System*, Tom Logsdon, Van Nostrand Reinhold, New York, 1992, pp. 17–90.

A second alternative configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+ 9k/16) GHz and f2=(1.246+7k/16) GHz, where k(=1,2, . . . 24) is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is modulated only by the P-code. The GLO- NASS satellites transmit navigational data at a rate of 50 Baud for C/A code and 100 Baud for P code. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites.

The range (Ri) between the location of the i-th SATPS satellite and the SATPS receiver is equal to the speed of light c times ($\Delta$ti), wherein ($\Delta$ti) is the time difference between the SATPS receiver's clock and the time indicated by the satellite when it transmitted the relevant phase. However, the SATPS receiver has an inexpensive quartz clock which is not synchronized with respect to the much more stable and precise atomic clocks carried on board the satellites. Consequently, the SATPS receiver actually estimates not the true range Ri to the satellite but only the pseudo-range (ri) to each SATPS satellite.

After the SATPS receiver determines the coordinates of the i-th SATPS satellite by picking up transmitted ephemeris constants, the SATPS receiver can obtain the solution of the set of the four equations for its unknown coordinates (x0, y0, z0) and for unknown time bias error (cb). The SATPS receiver can also obtain its heading and speed. (See *The Navstar Global Positioning System*, Tom Logsdon, Van Nostrand Reinhold, 1992, pp. 8–33, 44–75, 128–187.) The following discussion is focused on the GPS receiver, though the same approach can be used for any other SATPS receiver.

To prevent jamming signals from being accepted as actual satellite signals, the GPS satellites are provided with a secret Y-code, which replaces the known P-code when the "antispoofing" (AS) is ON. When the AS is OFF, the Y-code is turned OFF, and the known P-code (see above the cited and incorporated by reference document ICD-GPS-200) is used. Thus, the secret Y-code can be turned ON or OFF at will by the U.S. Government. The AS feature allows the GPS system to be used for the military or other classified United States Government projects. The unknown Y code is equal to the sum of the another unknown W code and known P code: Y=W+P.

The C/A code is transmitted on L1 under all conditions as it is generally required to provide timing access to L1 and L2 P(Y) code. When AS is OFF, the known P code is transmitted on both L1 and L2, allowing authorized and unauthorized users alike access to full coded receiver operation on both L1 and L2 frequencies. As it is indicated above, when AS is ON, the known P code is replaced with a secret Y code on both L1 and L2. Since the Y-code is classified, the commercial GPS users employ different techniques to recover some of the characteristics of the Y-code.

One such technique is proposed by Counselman III in U.S. Pat. No. 4,667,203, wherein the incoming signal is divided into upper and lower sidebands, which are multiplied together to obtain the second harmonic of the carrier signal. However, the degradation of the signal-to-noise ratio (SNR) is the same as with squaring the entire signal.

U.S. Pat. No. 4,972,431 issued to Keegan, discloses a different approach to the recovering of the unknown Y-code. The incoming encrypted P-code GPS signal is not immediately squared. Instead, after mixing with a local oscillator signal to lower its frequency to an intermediate frequency, the encrypted Y-code signal is correlated with a locally generated P-code signal. Since the locally generated P-code signal does not perfectly match the encrypted Y-code sequence, the correlation does not produce a sharp peak in the frequency spectrum. The result of the correlation is filtered by a bandpass filter, and the reduced-bandwidth signal is squared. Because the squaring step is performed over a narrower bandwidth than the original P-code, there is less degradation in the SNR of the received signal, as compared with squaring over the entire P-code bandwidth. The performance is more reliable under weak signal conditions because the cycle ambiguity of the carrier signal can be resolved more rapidly. The invention does not frustrate the intended purpose of P-code encryption.

However, the techniques described in the Keegan and Counselman patents result in a half wavelength L2 carrier phase observable, making it more difficult to quickly resolve carrier integer ambiguities.

In U.S. Pat. No. 5,293,170 issued to Lorenz, the modulated code period is estimated to be an integer multiple of P chips. The invention assumes the knowledge of the timing of the unknown Y-code. However, such Y-code timing information is not available to the commercial user and cannot be recovered without knowledge of the classified Y-code information.

In the existing prior art, unauthorized (and civilian) GPS users have been denied full access to the L2 signal and have been limited to full coded access of C/A code on L1. This results in subnormal signal-to-noise ratio (SNR). Full access to the L2 signal is particularly advantageous when attempting to perform accurate ionospheric measurements or corrections, and in real-time kinematic applications involving carrier cycle ambiguity searches.

What is needed is a system capable of receiving L1/L2 signals in a substantially similar and optimal way, wherein the AS can be ON, or OFF.

SUMMARY

The present invention is unique because it discloses an apparatus for delayed correlation of an unknown code capable of receiving L1/L2 signals in a substantially similar and optimal way, wherein the AS can be ON, or OFF.

One aspect of the present invention is directed to a method of delayed correlation of an unknown code.

In one embodiment, the method comprises the following steps: (1) receiving an unknown satellite code using a satellite receiving unit including a standard satellite antenna; (2) storing the normally-received unknown code for further correlation; (3) receiving a pre-processed HGA-received unknown code, wherein the pre-processed HGA-received unknown code was originally received using a High Gain Antenna (HGA); and (4) correlating the stored normally-received unknown code and the pre-processed HGA-received unknown code for performing the measurements without knowing the exact structure of the unknown code.

In the preferred embodiment, the method of delayed correlation of an unknown code further includes the step of delayed correlation of an unknown Y code emanating from GPS system.

The step of receiving the pre-processed HGA-received unknown Y code further includes the step of synchronizing the pre-processed HGA-received unknown Y code with the normally-received unknown Y code to re-establish the clock.

The step of correlating the stored normally-received unknown Y code and the pre-processed HGA-received unknown Y code further includes the steps of: (1) receiving C/A L1 code using the standard satellite antenna; (2) synchronizing locally generated P code with the L1 C/A code; (3) removing P code from the normally-received unknown Y code in order to store the unknown W code for further correlation with the pre-processed and HGA-received unknown W code; and (4) correlating the stored normally-received unknown W code and the pre-processed HGA-received unknown W code for performing the measurements without knowing the exact structure of the unknown W code.

Another aspect of the present invention is directed to a delayed correlation receiver.

In one embodiment, the delayed correlation receiver comprises: (1) a standard satellite antenna configured to receive the satellite signal coded with unknown code; (2) a memory for storing the normally-received satellite signal with unknown code; and (3) a correlation circuit configured to correlate the stored and delayed normally-received satellite signal with unknown code and the HGA-received and pre-processed unknown code to perform measurements without knowing the exact structure of the unknown code.

BRIEF DESCRIPTION OF THE DRAWINGS

FIG. 1 illustrates a simplified block-diagram of the delayed correlation receiver combination with a central station including a HGA and an extracting receiver.

FIG. 2 is a depiction of a W code power analysis.

FIG. 3 shows a delayed W correlation receiver.

FIG. 4 shows a delayed correlation processor.

FIG. 5 shows the steps of an acquisition process.

FIG. 6 is a depiction of the steps of a tracking process.

FIG. 7 is a flow chart of method of delayed correlation of an unknown code.

FULL DESCRIPTION OF THE PREFERRED EMBODIMENTS

FIG. 1 illustrates the block-diagram of a delayed correlation receiver (10) of the present invention in combination with a central station (12) designed to receive the satellite signals from the GPS satellites GPS-1 (14) and the GPS-2 (16)) using the high gain antennas (HGA) (18) and (20). The HGA system receives the GPS satellite signals with a significantly improved signal-to noise ratio (SNR) as compared with a conventional GPS antenna that has gain of 3 dB.

In one embodiment of the present invention each GPS satellite is tracked using a separate HGA.

The HGA can be implemented employing a parabolic dish antenna. The parabolic dish antennas suitable for the purposes of the present invention are produced by the Information Processing Systems, Inc., based in Belmont, Calif. The important characteristics of the parabolic antennas that can be utilized by the present invention (for observation frequency L1=1575.42 MHz) are given as follows: (a) antenna diameter=1.8 meters; (b) antenna gain=27 dB; (c) antenna beamwidth=7°.

The output of each HGA is fed into a W extracting receiver (22). The purpose of the W extracting receiver is to extract the W bit information from each satellite being observed. The extracted W bit streams are modulated and transmitted by the central station (12) such that they can be received by at least one delayed W correlation receiver (28). The delayed W correlation receiver (28) employs the conventional GPS antenna (30) capable of receiving the encrypted L1 and L2 code signals with the unknown W code from the satellites GPS-1 and the GPS-2. The delayed W correlation receiver (28) stores the observed samples of the satellite signals in order to compare them with the generated by the central station (12) representation of the W bits. The central station generates the representation of the W bits using the W extracting receiver (22) and the modulated (W) transmitter (24), and transmits the W bit streams to the delayed W correlation receiver (28) using the communication link (32). The delayed W correlation receiver (28) correlates its own stored encrypted L1 and L2 signals with the generated by the central station W code for each satellite being observed. Thus, the delayed W correlation receiver (28) can perform the full correlation of the L1 and L2 encrypted satellite signals without requiring the secret encryption keys.

The communication link (32) can comprise: (1) a radiowave frequency band; (2) an infrared frequency band; (3) a microwave frequency band; (4) the ISM (industrial scientific medical) unlicensed operation band, wherein the ISM band range is selected from a class of frequency range consisting of 900 MHz, 2.4 GHz, and 5.8 GHz; and wherein the user can own the both ends of the ISM communication system; (5) a real time circuit switched communication link; (6) a 1.8 GHz band, wherein the 1.8 GHz band supports the personal communications services (PCS); (7) a Low Earth Orbiting Satellites (LEOS), wherein the LEOS is used to store and to forward digital packet data; (8) a class of radiowave communication means consisting of a cellular telephone communication means, paging signal receiving means, a wireless messaging services, a wireless application services, a wireless WAN/LAN station, and an Earth-satellite-Earth communication module that uses at least one satellite to relay a radiowave signal; (9) an Advanced Mobile Phone System (AMPS) including a modem, wherein the modem is selected from a class consisting of a DSP (digital signal processor) modem, and a cellular digital packet data (CDPD) modem; and (10) a digital cellular telephone communication means, wherein the digital cellular telephone communication means includes a means of modulation of digital data over a radiolink selected from a class consisting of a time division multiple access (TDMA) system, and a code division multiple access (CDMA) system.

It is also feasible that the U.S. Department of Defense (DOD) could make noiseless W bits available a short time after the satellite transmitted W code is received on the ground. This would allow the delayed W correlation receiver (28) of the present invention access to the full code correlation on L1 and L2 for civilian use, without affecting the anti-spoofing primary goal of Y code.

The satellite signal acquisition should be accomplished before the signal tracking is accomplished. For the successful signal tracking the reference code tracking error should be decreased to less than +1 code chip error. Initially the central station (12) may have little knowledge of the satellite exact position and there may be a significant uncertainty as to the relative Doppler effect. With the C/A code there are a limited number, 1023, of code chips in the period. Thus, even without initial knowledge of position of the central station (12) relative to the position of the satellite, it is sufficient to search a maximum of 1023 code chips. If acquisition of the C/A code of one satellite can be accomplished within acquisition time T, then the total acquisition time for N satellites can be NT if a single central station (12) is time sequenced over the N satellites.

The output of the central station (12) is the W code bit, integrated across 22 P(Y) clocks, from the satellite being tracked. As long as the actual W code clocking rate is not constantly 90° out of phase with W SYNC, the W extracting receiver (22) is able to extract energy from the satellite being tracked.

FIG. 2 illustrates the power analysis of the W code. According to the power analysis, the W code has a dominant clock frequency at 22 P(Y) chips, aligned with the C/A code EPOCH. It follows, that an 'integrate and dump' circuit, realized in the W extracting receiver (22), synchronized to the C/A EPOCH and running at a rate of 22 P(Y) chips, provides the optimal estimation of W code bits even though the actual W code rate remains unknown.

FIG. 3 depicts an embodiment of the delayed W correlation receiver (28) of FIG. 1. The GPS satellites are received via the antenna 2 block (30 of FIGS. 1 and 3), that is a typical 3 dB gain, dual patch L1/L2 GPS antenna. It can be implemented by using a magnetically mountable model 21423-00 commercially available from Trimble Navigation of Sunnyvale, Calif. The signal (370) is then frequency translated, amplified, filtered, and sampled in the downconverter IF processor and sampling block (356). For the complete description of all these operations please see the U.S. Pat. No. 5,825,887, that is incorporated herein in its entirety.

The IL1 (384), QL1 (386), IL2 (388), and QL2 (390) outputs of the downconverter IF processor and sampling block (356) are digitally processed in the multiple delayed correlation processors (358), one per satellite tracked. The W code bits logged by the W extracting receiver (22), formatted by the modulated W transmitter (24), and transmitted using the communication link (32) (for the complete description of all these operations please see the U.S. Pat. No. 5,825,887) are received by the communications receiver (350).

The logged and formatted W bits are reformatted in the resynchronizing memory 2 block (362) back to conform to the standard W bits. The standard $W_1$ bits (364,1) (corresponding to the first satellite channel) through the $W_N$ bits (364,N) (corresponding to the N-th satellite channel) and the clocking signals for the first channel W $SYNC_1$ (366,1) through the clocking signal for the N-th channel W $SYNC_N$ (366, N) enter the delayed correlation processors (358) (1 through N). The delayed correlation processors perform correlation of their own observed encrypted satellite W code signals with the processed by the central station (12) W code for each observed satellite under the control of the $\mu$P system 2 (360).

The frequency oscillator 2 block (354) and the master oscillator 2 block (352) provide the clocking signals. The detailed embodiments of these two blocks are fully disclosed in the U.S. Pat. No. 5,825,887.

FIG. 4 depicts the delayed correlation processor block (358) of FIG. 3 which has the same representation for each satellite channel. The delayed correlation processor (358) is further divided into two blocks, L1 tracker (552) and L2 tracker (554). The L1 tracker is designed to perform delayed correlation on the L1 Y code signal. The L2 tracker is designed to operate on the L2 Y code. The operations of L1 tracker and L2 tracker are fully described in the U.S. Pat. No. 5,825,887.

The L1 acquisition process involves locking to the L1 C/A code signal first. Once the locally generated P code has been set up using timing information from the L1 C/A code tracking loop, the code and carrier tracking loops which were formed from the L1 C/A signal can be formed from the L1 Y code signal. Further use of L1 Y code tracking is useful in mitigating multipath effects (as Y code has a narrower chip width than C/A code) and in jamming environments. The technique also provides an anti-spoofing benefit as long as the communication link from the central station (12 of FIG. 1) is secured.

The biggest benefit of the delayed W code correlation technique is found when tracking the L2 Y code signal. When encrypted, L1 still transmits the C/A code and thus measurements may be made with this signal. On the other hand, when encrypted, the L2 signal only provides L2 Y code.

FIG. 5 and FIG. 6 describe the software acquisition and tracking modes. These modes of operation have been previously described in the U.S. Pat. No. 5,825,887.

In the acquisition mode, the L1 C/A code is locked in the code and carrier tracking loops (step 800). The step (802) is the set up of the code generators (1 and 2) for generation of the local P code. The following step (804) is the initiation of the logging process of L1 W bits into memory 1 and L2 W bits into memory 2 and performing the correlation process with the transmitted from the central station W bits. After L1 Y code and carrier loops are locked (step 806), L2 power is found (step 808), and the L2 Y code and carrier loops are locked (step 810). Thus, the acquisition mode is completed.

The tracking mode follows the acquisition of the satellite signals. At first, the correlators (2 and 3) are read (step 812). Secondly, the L1 Y and L2 Y code and carrier tracking loop feedbacks are formed and applied (step 814 and step 816). This allows to perform the L1 and L2 Y code carrier phase measurements (step 818) and the L1 ad L2 code phase measurements (step 820). This completes the tracking mode of operation.

FIG. 7 depicts the basic steps of the method of delayed correlation of an unknown code. At first, (in the step 902), an unknown satellite code is received using a satellite receiving unit including a standard satellite antenna. Secondly, (in the next step 904), the normally-received unknown code is stored for further processing.

Next, (in step 906), the delayed correlation receiver (28 of FIG. 3) also receives a pre-processed and HGA-received unknown code (using a communication link (32)) that was originally received using the High Gain Antennas (HGA) (18 and 20 of FIG. 1). Finally (in step 908), the delayed correlation processors (356 of FIG. 3) correlate the stored and normally-received unknown W code and the pre-processed HGA-received unknown W code and perform the measurements without knowing the exact structure of the unknown W code.

Before correlation is performed, the L1 C/A code is received using the standard satellite antenna (30 of FIG. 3), the locally generated P code is synchronized with the received L1 C/A code; and P code is removed from the normally-received Y code in order to store the unknown W code for further correlation with the pre-processed and HGA-received W code. As it is well known in the art, Y code=W code+P code.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. A method of delayed correlation of an unknown code, said method comprising the steps of:

receiving a normally-received unknown satellite code using a satellite receiving unit including a standard satellite antenna;

storing said normally-received unknown code for further correlation;

receiving a pre-processed HGA-received unknown code, wherein said pre-processed HGA-received unknown code was originally received using a High gain antenna; and correlating said stored normally-received unknown code and said pre-processed HGA-received unknown code for performing a measurement without knowing the exact structure of said unknown code, wherein said pre-processed HGA-received unknown code is used as a local signal for correlation purposes.

2. The method of claim 1, wherein said method of delayed correlation of an unknown code further includes the step of delayed correlation of an unknown Y code emanating from GPS system.

3. The method of claim 2, wherein said step of receiving said pre-processed HGA-received unknown Y code further includes the step of:

synchronizing said pre-processed HGA-received unknown Y code with said normally-received unknown Y code to re-establish a clock.

4. The method of claim 2, wherein said step of correlating said stored normally-received unknown Y code and said pre-processed HGA-received unknown Y code further includes the steps of:

receiving C/A L1 code using said standard satellite antenna;

synchronizing locally generated P code with said L1 C/A code; and removing P code from said normally-received unknown Y code in order to store the unknown and normally received W code; and correlating said stored normally-received unknown W code and said pre-processed HGA-received unknown W code for performing a measurement without knowing the exact structure of said unknown W code.

5. A delayed correlation receiver comprising:

a standard satellite antenna configured to primary receive a normally-primary-received satellite signal coded with an unknown code and to secondary receive a high-gain-antenna-(HGA)-primary-received, pre-processed and re-transmitted unknown code;

a memory for storing and delaying said normally-primary-received satellite signal with said unknown code; and a correlation circuit configured to correlate said stored and delayed normally-primary-received, satellite signal with said unknown code and said HGA-primary-received pre-processed, and re-transmitted unknown code to perform measurements without knowing the exact structure of said unknown code; wherein said pre-processed HGA-primary-received and re-transmitted unknown code is used as a local signal for correlation purposes.

* * * * *